US012746483B2

(12) United States Patent
Ittah

(10) Patent No.: US 12,746,483 B2
(45) Date of Patent: Sep. 29, 2026

(54) PARTIALLY TRANSPARENT BATH TOYS

(71) Applicant: Lynzee Ittah, Boca Raton, FL (US)

(72) Inventor: Lynzee Ittah, Boca Raton, FL (US)

( * ) Notice: Subject to any disclaimer, the term of this patent is extended or adjusted under 35 U.S.C. 154(b) by 180 days.

(21) Appl. No.: 18/814,547

(22) Filed: Aug. 25, 2024

(65) Prior Publication Data

US 2024/0416252 A1 Dec. 19, 2024

Related U.S. Application Data

(62) Division of application No. 18/090,486, filed on Dec. 29, 2022, now Pat. No. 12,303,800.

(51) Int. Cl.

| | |
|---|---|
| ***A63H 23/10*** | (2006.01) |
| ***A63H 33/04*** | (2006.01) |
| ***B29C 49/00*** | (2006.01) |
| *B29C 49/04* | (2006.01) |
| *B29K 101/12* | (2006.01) |
| *B29L 31/52* | (2006.01) |

(52) U.S. Cl.

CPC ............ *A63H 23/10* (2013.01); *A63H 33/04* (2013.01); *B29C 49/0005* (2013.01); *B29C 49/04* (2013.01); *B29K 2101/12* (2013.01); *B29K 2995/0025* (2013.01); *B29K 2995/0026* (2013.01); *B29L 2031/5209* (2013.01)

(58) Field of Classification Search

CPC ........ A63H 23/00; A63H 23/10; A63H 33/00; A63H 33/04; B29C 49/0005; B29C 49/04; B29K 2995/0025; B29K 2995/0026; B29K 2101/12; B29L 2031/5209

USPC ......... 446/153, 491; 425/532; 264/514, 515, 264/540

See application file for complete search history.

(56) References Cited

U.S. PATENT DOCUMENTS

| | | | | | |
|---|---|---|---|---|---|
| 1,918,874 | A * | 7/1933 | Shannahan | A63H 23/10 | 239/211 |
| 2,538,347 | A * | 1/1951 | Yates | A63H 23/06 | 446/163 |
| 2,730,765 | A * | 1/1956 | Crafton | A63H 3/28 | 249/142 |
| 2,791,466 | A * | 5/1957 | Crisp | B05B 1/18 | 285/8 |
| 2,967,330 | A * | 1/1961 | Tommarchi | B29C 49/04114 | 264/540 |
| 3,214,783 | A * | 11/1965 | Perry | A47K 5/122 | 401/28 |
| 4,078,792 | A * | 3/1978 | Arato | A63H 33/00 | 239/211 |
| 4,212,460 | A * | 7/1980 | Kraft | A63B 65/00 | 473/577 |
| 4,277,232 | A * | 7/1981 | Taluba | B29C 49/54 | 425/525 |

(Continued)

FOREIGN PATENT DOCUMENTS

GB 2587261 A * 3/2021 ............. A45D 19/02

*Primary Examiner* — Alexander R Niconovich

(74) *Attorney, Agent, or Firm* — Cittone Demers & Arneri LLP; James P. Demers

(57) ABSTRACT

A hollow thermoplastic toy for use in a child's bath, having a vent hole, a transparent region and an opaque region, is manufactured by blow-molding a parison which features a region of transparent thermoplastic and a region of opaque thermoplastic. The transparent region serves to permit visual detection of the growth of mold or mildew within the toy.

4 Claims, 2 Drawing Sheets

(56) References Cited

U.S. PATENT DOCUMENTS

| | | | | | |
|---|---|---|---|---|---|
| 4,277,300 | A * | 7/1981 | Taluba | G10K 5/00 156/244.14 |
| 4,380,134 | A * | 4/1983 | Taluba | B29C 49/54 446/188 |
| 4,890,994 | A * | 1/1990 | Shapler | B29C 49/04 425/467 |
| 5,464,107 | A * | 11/1995 | Koeniger | B29C 48/09 264/514 |
| 6,119,286 | A * | 9/2000 | Briscoe | A63H 33/28 4/675 |
| 7,793,618 | B2 * | 9/2010 | Edwards | A01K 15/026 119/702 |
| 7,997,229 | B2 * | 8/2011 | Saborio | A01K 15/025 119/72 |
| 8,087,595 | B1 * | 1/2012 | Freese | A45D 44/00 239/289 |
| 8,557,151 | B2 * | 10/2013 | Lipson | B29C 49/04 215/382 |
| 8,956,196 | B2 * | 2/2015 | Rickenbach | A63H 23/10 446/153 |
| 9,295,233 | B2 * | 3/2016 | Axelrod | A01K 15/026 |
| 10,039,989 | B2 * | 8/2018 | McGregor | G09B 23/12 |
| 10,478,738 | B1 * | 11/2019 | Wong | A63H 23/10 |
| 10,889,046 | B2 * | 1/2021 | Anderson | B29B 17/0005 |
| 10,960,318 | B2 * | 3/2021 | Sy | A63H 23/005 |
| 11,091,306 | B2 * | 8/2021 | Ishihara | B31B 70/00 |
| 11,905,190 | B2 * | 2/2024 | Dillow | A47K 3/001 |
| 2002/0073927 | A1 * | 6/2002 | Chamberlain | A01K 15/026 119/72 |
| 2011/0014845 | A1 * | 1/2011 | Monahan | A63H 23/10 446/153 |
| 2011/0306265 | A1 * | 12/2011 | Mor | A63H 23/12 446/15 |
| 2013/0061384 | A1 * | 3/2013 | Robertson | E04H 4/14 4/496 |
| 2015/0125574 | A1 * | 5/2015 | Arent | B65D 75/525 426/106 |
| 2019/0314734 | A1 * | 10/2019 | Cayton | A63H 33/28 |
| 2023/0149824 | A1 * | 5/2023 | Westerhaus | A63H 23/10 446/153 |

* cited by examiner

PARTIALLY TRANSPARENT BATH TOYS

REFERENCE TO PRIOR APPLICATIONS

This application claims benefit as a divisional of prior-filed U.S. patent application Ser. No. 18/090,486 filed on Dec. 29, 2022.

FIELD OF THE INVENTION

The present invention relates generally to toys for children, in particular to toys intended for use in the bath.

BACKGROUND

Bath toys are commonly used to keep children entertained when taking a bath. At present, the vast majority are constructed or molded from synthetic polymers, due to the resistance of such polymers to degradation by water and soaps, and to their ability to withstand rough handling during play. Most such toys are hollow, to ensure that they float, and many of these hollow items feature a small hole somewhere in their surface, which normally arises as an artifact of the blow molding process.

Blow molding is the forming of a hollow object by inflating or blowing a thermoplastic molten tube or “parison” into a shape dictated by a surrounding mold. The process consists of extruding or “dropping” a parison, upon which the mold halves are closed. The mold interior defines the shape of the product to be produced. The bottom opening of the parison is pinched shut by the closing mold halves, while the top opening is closed around an air inlet. Pressurized air is introduced into the top of the parison, blowing the heated parison out against the cavity walls to form the product. Once the product has cooled sufficiently, the mold is opened, the product is removed, and excess thermoplastic that was trapped between the mold halves is trimmed away. Removal of the air inlet tube leaves the hole noted above.

The hole is generally not sealed, as the sealing step would raise manufacturing costs; furthermore the hole serves as a vent to equalize air pressure inside and outside of the toy as temperatures change during manufacturing, transportation, and warehousing, and when in use by the consumer. Furthermore, children are especially fond of “squirting” toys, and sealing the hole would render the toy less entertaining.

The vent hole has a singular disadvantage, in that the introduction of water to the interior of the toy creates a dark and moist environment that is favorable for the growth of mold and mildew. Parents become distressed when they discover that a toy has been incubating microbial sludge, especially if the child is teething or otherwise inclined to chew on his or her bath toys. Unfortunately, it is usually not obvious that a toy is in this condition until the growth of mold or mildew is so extensive that dark particles are seen to be floating in water draining from the vent hole. Toys could be molded from transparent polymers in order to remedy this problem, but children—and parents—prefer brightly-colored toys, and the demand for colorless, transparent toys is accordingly limited.

There is a need for bath toys that make it apparent that they are due for cleaning and disinfecting, while retaining the bright colors that make them attractive and entertaining for children.

SUMMARY OF THE INVENTION

The following presents a simplified summary relating to one or more aspects and/or embodiments disclosed herein. The summary does not disclose all contemplated aspects or embodiments, and in no way delineates the scope of the invention. It should be appreciated that while the present specification refers to “bath toys”, the term is not limited to toys specifically manufactured for use in the bath. A wide variety of children’s toys are of the hollow, blow-molded type, and children are prone to take their favorites into the bath regardless of the use originally intended by the manufacturer. The present invention is applicable, in general, to all toys having a hollow polymer construction.

In its broadest aspect, the invention provides hollow plastic toys having a vent hole, a transparent region, and an opaque region. The toys are preferably manufactured by a process of extrusion blow molding, where a clear and an opaque plastic are fed through an extruder either simultaneously or sequentially, so as to form a parison having a transparent region and an opaque region. Blow molding of this parison in the usual manner then produces a hollow toy with transparent and opaque regions.

Further objects and advantages of the invention will become apparent from a consideration of the drawings and the ensuing descriptions.

DETAILED DESCRIPTION OF THE INVENTION

Figure 1:
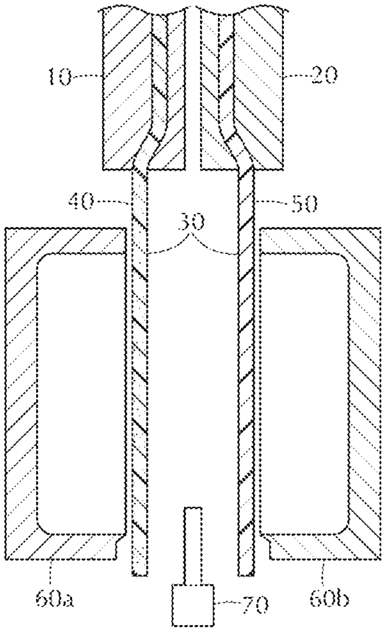
FIG. 1 is a cross-section illustrating the extrusion of a molten thermoplastic parison having an opaque region and a transparent region, in accordance with one embodiment of the invention.

The following detailed description and accompanying drawings disclose various aspects and/or embodiments of the invention. Certain substitutions and equivalents will be apparent to those of skill in the relevant arts, and alternative embodiments may be devised without departing from the scope of the invention and the appended claims.

In one embodiment of a method, an extrusion blow molding (EBM) process is employed that involves the use of an opaque thermoplastic and a transparent thermoplastic. In at least some embodiments, the EBM process involves extrusion of the transparent and opaque thermoplastics simultaneously, or nearly simultaneously, to form a parison. The extrusion processes for one color may begin before, during, or after the extrusion of the other color.

Suitable thermoplastics for use in the EBM process include, but are not limited to, high density polyethylene (HDPE), low density polyethylene (LDPE), polypropylene (PP), and polyvinyl chloride (PVC). Transparency in EBM products, however, is not so readily obtained. Certain grades of PVC yield transparent products, and PP can be made transparent by polymerization in the presence of a clarifying agent. For this reason, the preferred transparent thermoplastics of the invention are clarified PP and PVC. Suitable clarifying agents include, but are not limited to, 1,3-O-2,4-bis(3,4-dimethylbenzylidene) sorbitol, available from Milliken and Company under the trade name Millad® 3988; bis(4-propylbenzylidene) propylsorbitol, available from the Milliken Co. under the trade name Millad® NX 8000;

sodium 2,2'-methylene-bis-(4,6-di-tert-butylphenyl) phosphate, available from Asahi Denka Kogyo K. K. under the tradename NA-11, aluminum methylenebis(2.4-di-tert-butyl-benzyloxy) phosphate, available from Adeka Corp. under the trade name ADK STAB NA-21; and the like.

The opaque thermoplastic is preferably also PP or PVC, although any other thermoplastic can be used if it is compatible with the transparent thermoplastic in the EBM process, i.e. it melts at a comparable temperature, is miscible with or bonds well to with the transparent thermoplastic, and has comparable physical properties. The opaque thermoplastic is preferably dyed or pigmented with any of the numerous coloring agents known in the industry, such as those available from Color Master Inc. Thermoplastic beads suitable for extrusion blow molding are commercially available in colored form from many suppliers in the plastics industry.

The thermoplastics are typically fed, in the form of pellets, to an extrusion machine having multiple extruders. The two colors are separately fed to respective extruders that feed the dies of an extruder die head. The extruder die head then forms a parison (a hollow tube) of hot, viscous plastic that has transparent and opaque sections, typically presenting in the form of vertical stripes. Suitable coextrusion apparatus for producing multicolored parisons are disclosed, for example, in US Patent Application Publication No. 2006/0038310 and U.S. Pat. No. 7,661,945, both of which are incorporated herein by reference in their entireties.

Machinery for coextrusion blow molding, using multiple extruders for each of the distinct materials in the coextrusion, is available in the industry, for example from Chen Way Machinery Co., Ltd. of Taiwan. Commonly used to manufacture multilayer "sandwich wall" containers, the machinery can be configured to co-extrude parisons having the different materials in stripes rather than layers.

Depending on the number of dies, and on the pattern of thermoplastics fed to them, the produced parison may have two or more differently colored sections, and the sections may be of the same or different widths. The hot and still-soft parison is transferred to a mold and blown into the desired shape in the usual manner. The machinery and techniques employed for blow-molding are well-known to those of skill in the art, and need not be described here.

For simplicity and convenience, those embodiments having two sections, one transparent and one opaque, will be described in more detail below, but the invention is not limited to these embodiments. In general, any number of transparent sections, of any width, can be employed, so long as they provide sufficient visibility of the interior of the toy to permit the visual detection of mold and mildew growth. Within that constraint, the aesthetic appearance of the toy can be varied considerably by the selection and arrangement of the opaque and transparent sections. By way of example, a single narrow strip of transparent thermoplastic may provide a window into the interior, or alternatively one half or more of the toy can be made transparent.

FIG. 1 is a cross-sectional diagram showing extruder die head 10, through which an opaque thermoplastic 40 is being extruded, and extruder die head 20, through which a transparent thermoplastic 50 is being extruded. Each extruded portion, in full, has the approximate shape of a half-cylinder, and together the two half-cylinders form cylindrical parison 30. When the parison reaches a suitable length, the mold halves 60*a* and 60*b* are brought together to pinch off the parison at top and bottom. Typically, a blade will then cut off and remove the extruded thermoplastic remaining between the mold and the die heads.

Figure 2:
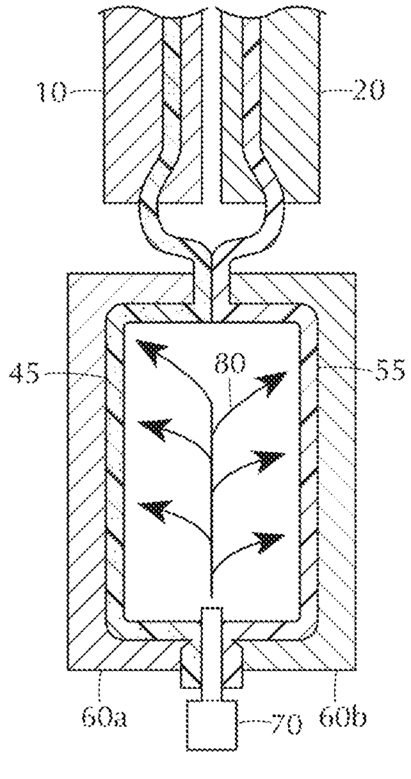
FIG. 2 is a cross-section illustrating the blowing of the parison of FIG. 1 into a mold, in accordance with one embodiment of the invention.

As shown in FIG. 2, air 80 is blown through nozzle 70 to inflate the parison against the inner surfaces of the mold, to form the desired hollow item having an opaque region 45 and a transparent region 55. The inflated plastic item is allowed to cool until solid; this process can be accelerated if desired by circulating water or other coolant through the walls of the mold. Withdrawal of nozzle 70 and separation of the mold halves 60*a* and 60*b* release the formed item, which is typically trimmed of excess plastic to yield the finished product.

Figure 3:
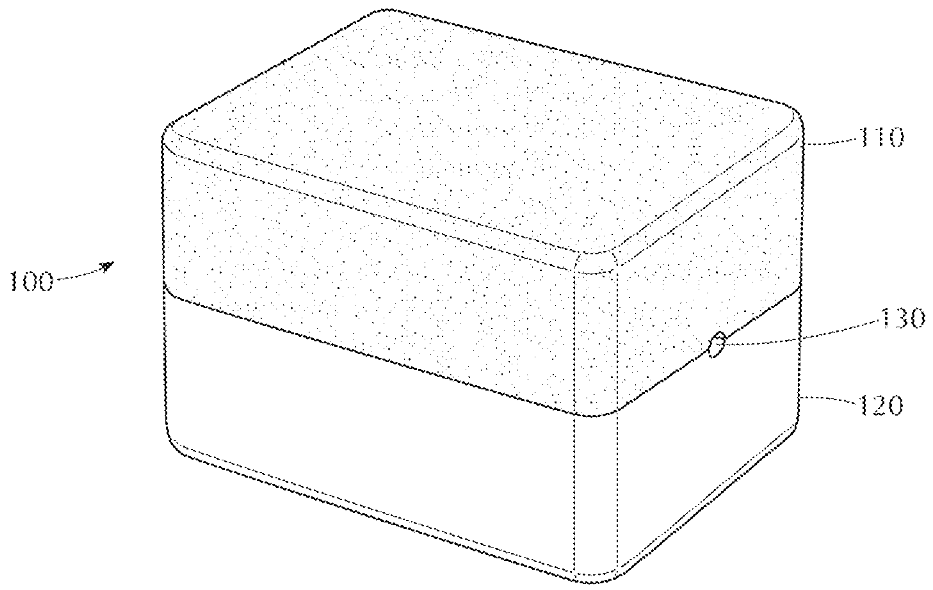
FIG. 3 is a perspective view of a child’s plastic building block having a transparent region and an opaque region, in accordance with one embodiment of the invention.

The particular embodiment illustrated yields a rectangular building block 100, as shown in FIG. 3, having an opaque half 110 and a transparent half 120. Typical building blocks of this form will range from about one-half inch to about four inches in their largest dimension, more commonly from about one inch to about three inches. Toys of other shapes and forms typically range up to about 12 inches in their longest dimension. The vent hole 130 is the result of the withdrawal of nozzle 70 from the mold after the formed item has solidified. Typically, the vent hole will be from 0.8 mm to 2.5 mm in diameter, more commonly from 1.0 to 2.0 mm.

In the illustrated embodiment, the parison is approximately one-half opaque and one-half transparent, yielding a toy block that is half opaque and half transparent, but it will be apparent that the relative proportions of the two thermoplastics can be varied to obtain any desired appearance. The percentage of the surface area of the toy that is transparent may range from 5% to 95%, but is preferably from 10% to 90%, more preferably from 20% to 80%, and even more preferably from 30% to 70%. In particularly preferred embodiments, the percentage that is transparent ranges from 40% to 60%.

It will further be apparent that multiple dies can be used to generate a parison having multiple alternating clear and opaque strips, which after being blown into a mold yields a product that is likewise comprised of alternating clear and opaque strips. Shapes other than the exemplified block can of course be generated from appropriately-shaped molds, and it is anticipated that any hollow plastic toy currently on the market can be reproduced with a transparent region by the methods of the invention.

The transparent region of the toys of the invention permit the visual detection of water within the toy, which may have entertainment value to the child playing with it. A parent can readily determine which toys contain, and need to be drained of, bath water. The presence of mold or mildew within the toy can likewise be detected visually, and appropriate cleaning and disinfecting steps can then be taken. For example, a diluted solution of hypochlorite bleach, hydrogen peroxide, or a benzalkonium biocide can be introduced into the interior of the toy.

The invention has been disclosed by describing and illustrating specific representative embodiments. Certain equivalents and substitutions of various methods and elements will be apparent to those of skill in the relevant arts, and such obvious variations are contemplated to be within the scope and spirit of the invention and the appended claims.

I claim:

1. A hollow toy having a vent hole and having visibility into an interior of the toy sufficient to permit visual detection of mold and mildew growth, manufactured by process comprising:

(a) extruding a transparent thermoplastic and an opaque thermoplastic to form a parison having a transparent region and an opaque region, (b) blow-molding the parison within a mold, by blowing air into the parison through a nozzle, so as to form the hollow toy and provide the toy with transparent and opaque regions, (c) withdrawing the nozzle from the mold after the formed toy has solidified, and (d) trimming excess thermoplastic so as to form the vent hole;

wherein the toy is capable of floating in a bath, and wherein the vent hole enables the toy to be useful as a squirting toy.

2. The toy according to claim 1, wherein the region of the toy that is formed from a transparent thermoplastic accounts for 10-90% of the surface area of the toy.

3. The toy according to claim 2, wherein the region of the toy that is formed from a transparent thermoplastic accounts for 30-70% of the surface area of the toy.

4. The toy according to claim 3, wherein the region of the toy that is formed from a transparent thermoplastic accounts for 40-60% of the surface area of the toy.

* * * * *